United States Patent
Takeishi et al.

[11] Patent Number: 6,031,713
[45] Date of Patent: Feb. 29, 2000

[54] ALUMINUM ELECTROLYTIC CAPACITOR

[75] Inventors: Nobuhiro Takeishi; Makoto Uemura, both of Uji; Toshiaki Shimizu, Hirakata; Hirohiko Kubo, Kyoto; Morihiro Yamada, Hirakata, all of Japan

[73] Assignee: Matsushita Electric Industrial Co., Ltd., Osaka, Japan

[21] Appl. No.: 09/104,644

[22] Filed: Jun. 25, 1998

[30] Foreign Application Priority Data

Jun. 25, 1997 [JP] Japan ................................ 9-168244

[51] Int. Cl.⁷ .................................................. H01G 2/10
[52] U.S. Cl. ............................................ 361/517; 361/535
[58] Field of Search ................................ 361/509, 511, 361/517, 518, 519, 529, 530, 535, 534, 536, 537, 301.3; 174/52.4

[56] References Cited

U.S. PATENT DOCUMENTS

| | | | |
|---|---|---|---|
| 3,624,458 | 11/1971 | Howell | 361/518 |
| 4,110,816 | 8/1978 | Deckert et al. | 361/535 |
| 4,760,494 | 7/1988 | Crum | 361/272 |
| 5,177,673 | 1/1993 | Nagara et al. | 361/527 |

FOREIGN PATENT DOCUMENTS

| | | | |
|---|---|---|---|
| 1-80016 | 3/1989 | Japan | 361/517 |
| 2-106016 | 4/1990 | Japan | 361/517 |
| 4-91419 | 3/1992 | Japan | 361/517 |

*Primary Examiner*—Kristine Kincaid
*Assistant Examiner*—Anthony Dinkins
*Attorney, Agent, or Firm*—Ratner & Prestia

[57] ABSTRACT

An anode foil, a cathode foil and a separator therebetween are rolled up into a capacitor element, and driving electrolyte is impregnated into the capacitor element. The capacitor element is housed in a metal case 12, and its opening is sealed by a sealer 13. The metal case 12 is made of an alloy of aluminum and manganese. Since this alloy has the higher hardness than that of a conventional case, the case is hard to be deformed even the capacitor is left in a high temperature atmosphere.

2 Claims, 1 Drawing Sheet

ALUMINUM ELECTROLYTIC CAPACITOR

BACKGROUND OF THE INVENTION

The present invention relates to an aluminum electrolytic capacitor utilized in various electronic apparatuses.

A conventional type of aluminum electrolytic capacitor has the following structure as shown in FIG. 2: A capacitor element 1 is housed in a metal case 2 made of aluminum and shaped in cylinder with a bottom plate, and an opening of the metal case 2 is sealed by a sealer 3 in order to prevent driving electrolyte from vaporizing. Further, an outside of the metal case 2 is covered by a tube 4 made of resin. The capacitor element 1 comprises a rolled member of an anode foil and a cathode foil as well as a separator therebetween, and driving electrolyte impregnated into the rolled member, where the anode foil employs a metal foil (used for valve action) of which surface is roughened, and a dielectric oxide film is formed on the surface, and the cathode foil employs an aluminum foil of which surface is roughened.

However, because the metal case 2 of the above aluminum electrolytic capacitor is made of only aluminum, the case 2 is vulnerable to being deformed resulting from pressure rising within the case 2 when the capacitor is left in a high temperature atmosphere, and in due course of time, an explosion-proof valve 5 formed by a thin-part of the bottom plate is activated, thereby the capacitor loses its original function.

SUMMARY OF THE INVENTION

The present invention addresses the above problem, and aims to provide a long-life aluminum electrolytic capacitor of which metal case is prevented from being deformed when the capacitor is left in a high-temperature atmosphere.

The aluminum electrolytic capacitor of the present invention comprises the following elements:

(a) a capacitor element made of a rolled anode and cathode foils and a separator therebetween, (b) driving electrolyte which is impregnated into the capacitor element, (c) a metal case having a bottom plate and shaped in a cylinder, for housing the capacitor element, (d) a sealer for sealing an opening of the metal case.

The metal case is made of an alloy of aluminum and at least one different metal from aluminum. According to the above structure, the higher hardness of the metal case than that of the conventional case is obtained, thus a deformation thereof resulting from a pressure rising within the case can be suppressed, when the capacitor is left in a high temperature atmosphere.

It is preferable to use manganese for being alloyed with aluminum, i.e., the metal case is desirably made from the alloy of aluminum and manganese. This arrangement allows the metal case to have the higher hardness without damping processing property and corrosion resistance. As a result, the deformation of the metal case can be suppressed along with maintaining a simple manufacturing method.

DESCRIPTION OF THE PREFERRED EMBODIMENTS

Figure 1:
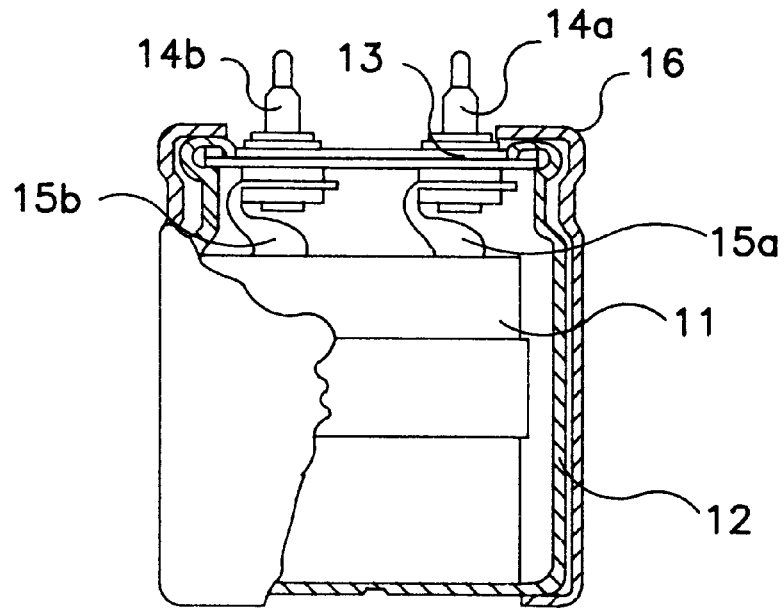
FIG. 1 is a partial cut-away face-on view of an aluminum electrolytic capacitor utilized in a first exemplary embodiment of the present invention.
Figure 2:
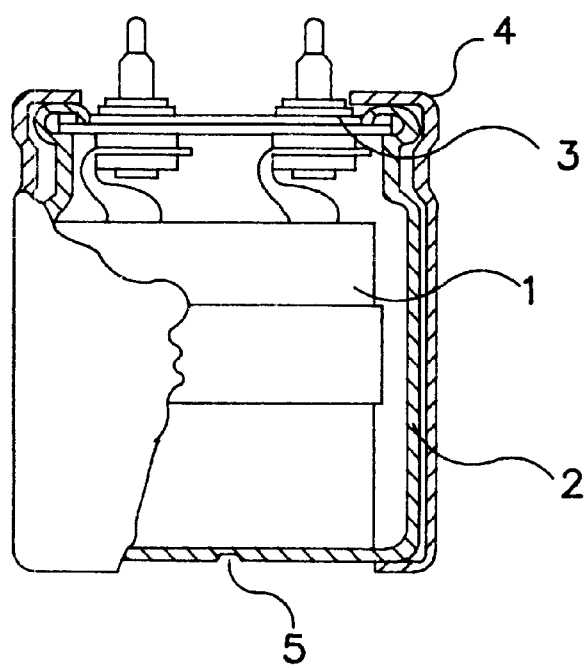
FIG. 2 is a partial cut-away face-on view of a conventional aluminum electrolytic capacitor.

One of preferred exemplary embodiments is described hereinafter by referring to FIG. 1.

A capacitor element 11 comprises a rolled anode and cathode foils with a separator therebetween. The anode foil is made of a metal foil for valve action and roughened on its surface, further, a dielectric oxide film is formed thereon by oxidizing the anode. The cathode foil is made of aluminum foil and is roughened on its surface. The capacitor element is impregnated with driving electrolyte, and then housed in a metal case 12 having a bottom plate and shaped in a cylinder. The metal case 12 is made from an alloy of aluminum and manganese.

An opening of the case 12 is sealed by the sealer 13 to prevent the driving electrolyte inside the case 12 from vaporizing. The sealer 13 is mounted with an anode outer terminal 14a and a cathode outer terminal 14b. Both the terminals 14a and 14b are coupled with lead members 15a and 15b which are coupled to the anode foil and cathode foil respectively. The outside of the case 12 is covered by a resin tube 16.

Since the metal case 12 of this aluminum electrolytic capacitor is made of the alloy of aluminum and manganese, the hardness of the case 12 is higher than that of the conventional case. Accordingly, if the pressure inside the case 12 is boosted after the capacitor has been left in a high temperature atmosphere, the deformation of the case 12 is suppressed. As a result, the life of the capacitor is prolonged, while electric characteristics including an electrostatic capacitance, tan δ of a loss angle, and a leakage current are remained at the same levels as those of the conventional capacitor.

The alloy employed in the metal case 12 preferably contains manganese 1.0–1.5 weight %. When contained manganese is less than 1.0 weight %, the hardness of the alloy is not sufficient, while it exceeds 1.5 weight %, the hardness is too high and the capacitor invites rather poor processing property.

The electrical characteristics of two types of aluminum electrolytic capacitors having different rated values are discussed here by comparing with the conventional capacitor.

Prototype products A and B shown in Table 1 have a metal case made of only aluminum. Prototype products C and D have a metal case made of the alloy of aluminum and manganese according to the present invention. All of these prototype products employ a self-supported substrate and are used as smoothing capacitors for power supplies.

Table 2 shows the results of high temperature load test for the prototype products A, B, C and D. The test condition is as follows:

Holding temperature: 110° C., Test time: 5000 hours

TABLE 1

| Prototype No. | A: conventional | B: conventional | C: invention | D: invention |
| --- | --- | --- | --- | --- |
| Rated voltage | 200 V | 400 V | 200 V | 400 V |
| Rated capacitance | 470 μF | 390 μF | 470 μF | 390 μF |

TABLE 2

| | | Prototype product No. | | | |
| --- | --- | --- | --- | --- | --- |
| Characteristics | | A | B | C | D |
| Initial characteristic | Capacitance | 475 μF | 399 μF | 471 μF | 396 μF |
| | loss angle | 5.94% | 4.58% | 5.85% | 4.77% |
| | Leakage current | 89.6 μA | 74.1 μA | 88.1 μA | 80.6 μA |

TABLE 2-continued

| Characteristics | | Prototype product No. | | | |
| --- | --- | --- | --- | --- | --- |
| | | A | B | C | D |
| characteristic after 5000 H | rate-change electrostatic capacitance: | — | — | −2.8% | −2.5% |
| | loss angle | — | — | 7.38% | 6.96% |
| | leakage current: | — | — | 48.1 µA | 42.1 µA |
| | appearance | Valve activates: 3000 hours | Valve activates: 3000 hours | No abnormal | No abnormal |

As shown in Table 2, the conventional types A and B are found that the explosion proof valve is activated in 3000 test hours, while the prototype of the present invention C and D are found that the explosion proof valve is not activated in 5000 test hours. Further, in C and D, extremely small rate-change of electrostatic capacitance is observed, and other electrical characteristics including the loss angle tan δ and leakage current is improved.

In the above exemplary embodiment, the alloy of aluminum and manganese is employed, i.e., manganese is used as the most preferred metal to be alloyed with aluminum. Besides manganese, zinc, magnesium, copper or nickel can be selected to be alloyed with aluminum. Further, more than one of these metals can be selected to be alloyed with aluminum.

The present invention is not limited to the above embodiment, rather, various modifications are available. For example, in the above embodiment, lead members 15a and 15b coupled to the anode foil and cathode foil are connected to the anode outer terminal 14a and cathode outer terminal 14b of the aluminum electrolytic capacitor; however, the lead wires coupled to the anode foil and cathode foil are pulled out through the sealer 13 to outside of the aluminum electrolytic capacitor. Therefore, the modifications within the scope of the spirit of the invention are included in the range of the claims described hereinafter.

What is claimed is:

1. An aluminum electrolytic capacitor comprising:
   a capacitor element comprising an anode foil, a cathode foil and a separator therebetween, wherein said anode foil, said cathode foil and said separator are rolled up together,
   driving electrolyte for being impregnated into said capacitor element,
   a metal case having a bottom plate and shaped in a cylinder for housing said capacitor element, and
   a sealing member for sealing an opening of said metal case,
      wherein said metal case comprises an alloy of aluminum and at least one different metal from aluminum.

2. The aluminum electrolytic capacitor as defined in claim 1, wherein said different metal from aluminum is manganese.

* * * * *